(12) United States Patent
Dohi

(10) Patent No.: US 10,931,401 B2
(45) Date of Patent: Feb. 23, 2021

(54) LIKELIHOOD GENERATION DEVICE

(71) Applicant: Mitsubishi Electric Corporation, Tokyo (JP)

(72) Inventor: Keisuke Dohi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/609,927

(22) PCT Filed: Jun. 27, 2017

(86) PCT No.: PCT/JP2017/023577
§ 371 (c)(1),
(2) Date: Oct. 31, 2019

(87) PCT Pub. No.: WO2019/003301
PCT Pub. Date: Jan. 3, 2019

(65) Prior Publication Data
US 2020/0119841 A1  Apr. 16, 2020

(51) Int. Cl.
*H04L 1/00* (2006.01)
*H04L 27/00* (2006.01)

(52) U.S. Cl.
CPC .......... *H04L 1/0054* (2013.01); *H04L 1/0052* (2013.01); *H04L 27/0012* (2013.01)

(58) Field of Classification Search
CPC . H04L 1/0054; H04L 1/0052; H04L 27/0012; H04L 27/38
See application file for complete search history.

(56) References Cited

U.S. PATENT DOCUMENTS 7,532,683 B2 * 5/2009 Koslov ............... H04L 27/0008
375/316
8,831,123 B2 * 9/2014 Bae ........................ H04L 27/38
375/262
(Continued)

FOREIGN PATENT DOCUMENTS

JP          2004-194079 A      7/2004
WO     WO 2015/056342 A1     4/2015

OTHER PUBLICATIONS

Dohi et at al., "Impact of Quantization for M-ary QAM with Soft-Decision Error Correction", IEICE Technical Report, vol. 116, No. 112, OCS2016-17, Jun. 16, 2016, pp. 43-48.
(Continued)

*Primary Examiner* — Sophia Vlahos
(74) *Attorney, Agent, or Firm* — Birch, Stewart, Kolasch & Birch, LLP

(57) ABSTRACT

A likelihood generation device includes a similarity detection unit, a likelihood table reference unit, and a similarity processing unit. The similarity detection unit receives a modulation scheme selection signal and a received value, detects a likelihood similarity between information bits included in the received value based on the modulation scheme selection signal, and outputs a likelihood selection signal that specifies likelihood data to be searched for and an operation selection signal that specifies an operation on the likelihood data. The likelihood table reference unit registers, as likelihood data, a small region different from other small regions in the likelihood distribution indicating the likelihood of the information bits, and extracts likelihood data based on the likelihood selection signal from the likelihood table. The similarity processing unit obtains the entire likelihood distribution by performing an operation designated
(Continued)

by the operation selection signal on the extracted likelihood data.

6 Claims, 14 Drawing Sheets

(56) References Cited

U.S. PATENT DOCUMENTS

| | | | | |
|---|---|---|---|---|
| 2008/0291819 A1* | 11/2008 | Gho | ............... | H04L 1/0052 |
| | | | | 370/208 |
| 2015/0149840 A1* | 5/2015 | Alhussien | ............ | G11C 16/08 |
| | | | | 714/719 |
| 2016/0233982 A1 | 8/2016 | Fujimori et al. | | |

OTHER PUBLICATIONS

Sandell et al., "Efficient Demodulation of General APSK Constellations", IEEE Signal Processign Letters, vol. 23, No. 6, Jun. 2016, pp. 868-872.
Yoshida et al., "Hardware-efficient Precise and Flexible Soft-demapping for Multi-Dimensional Complementary APSK Signals", 42nd European Conference and Exhibition on Optical Communications, ECOC 2016, Sep. 22, 2016, pp. 1097-1099.

* cited by examiner

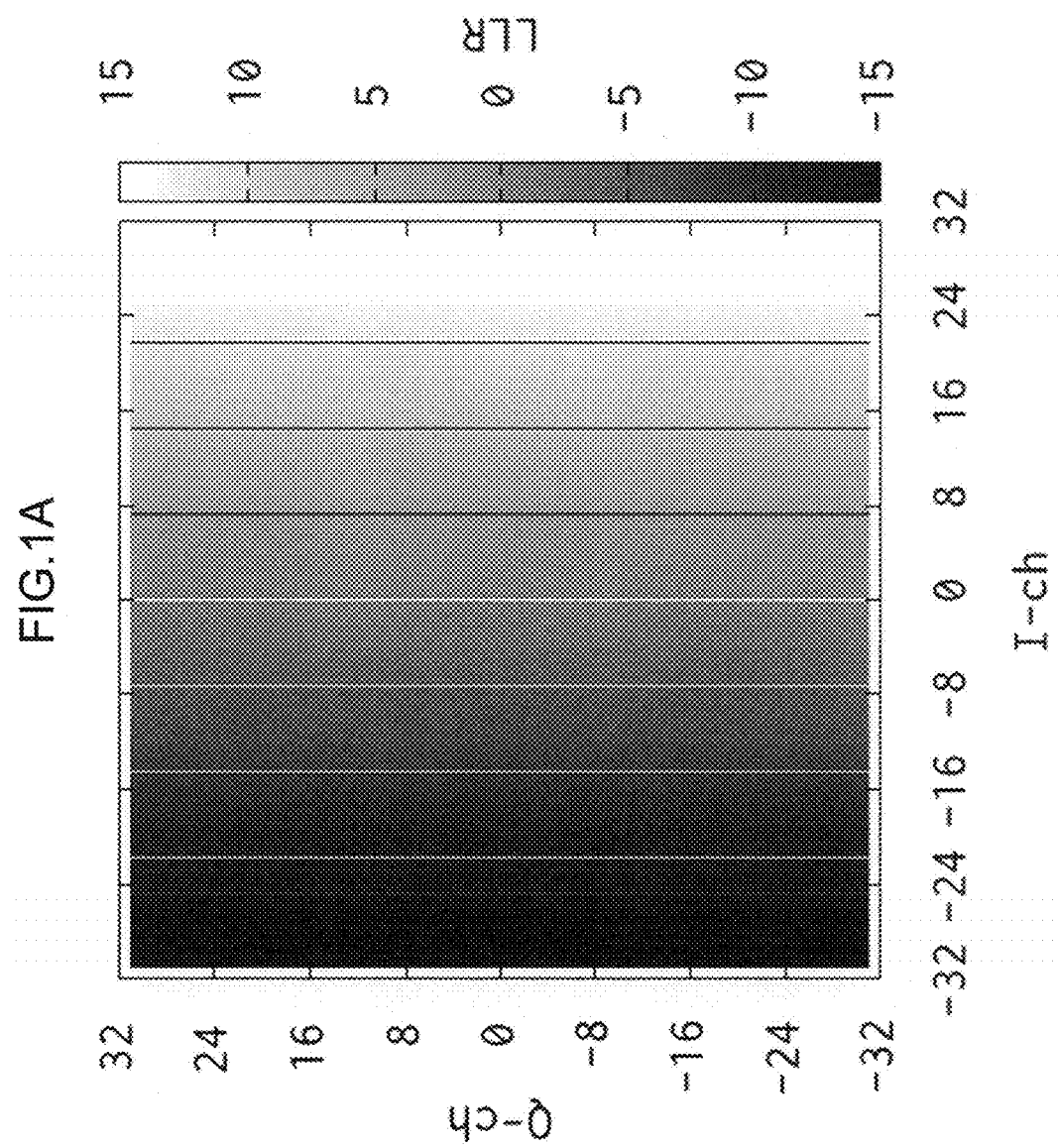

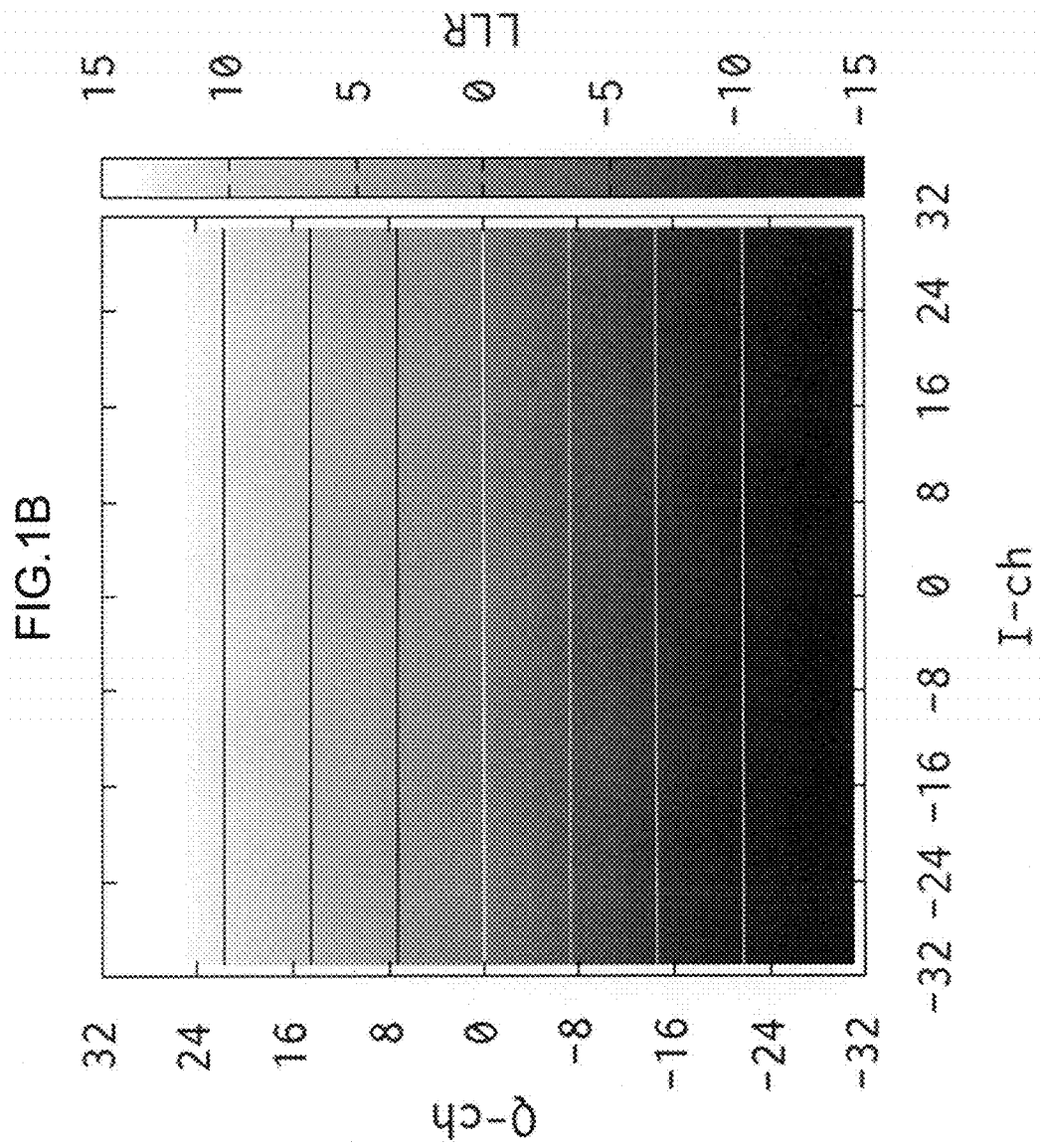

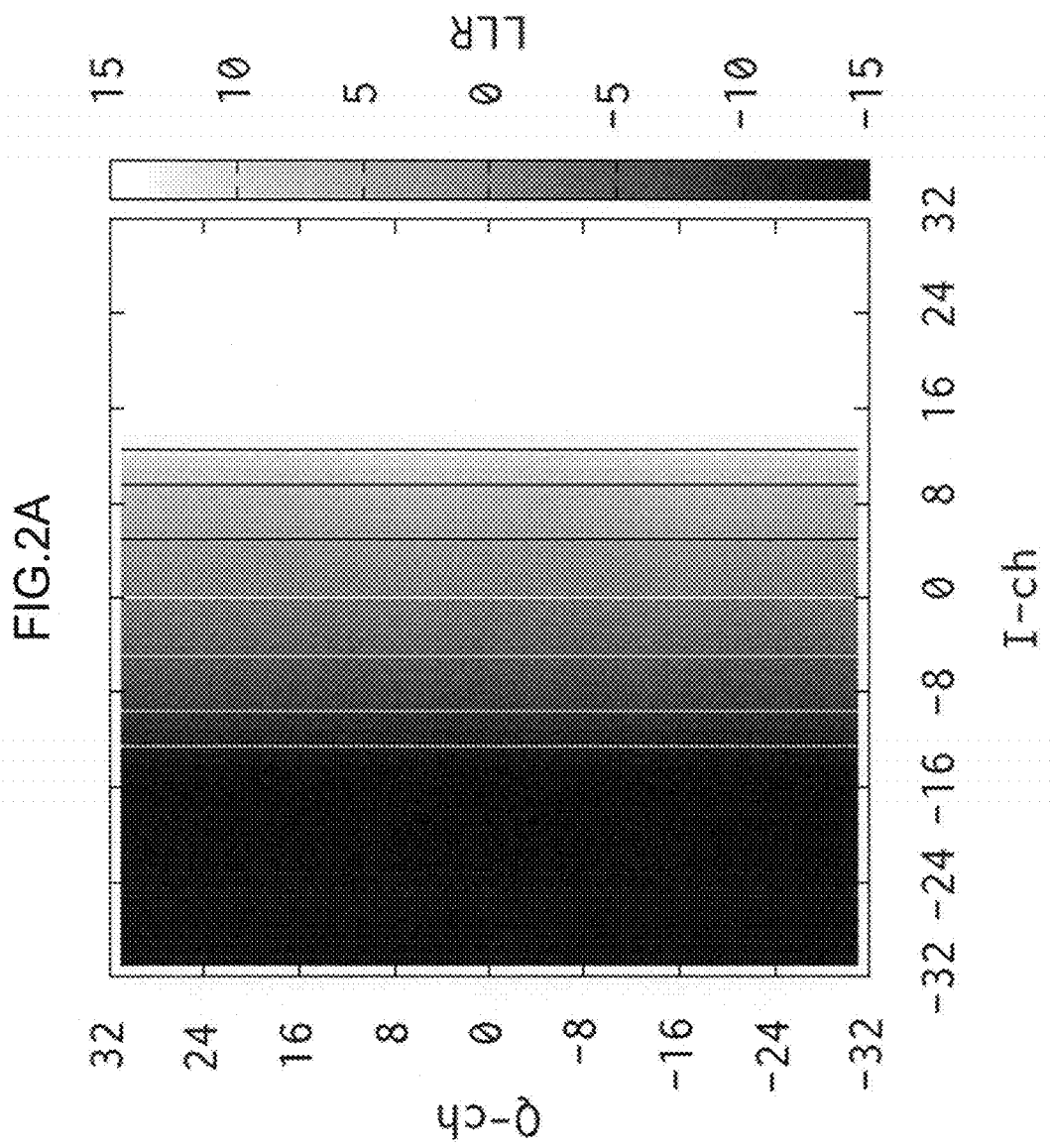

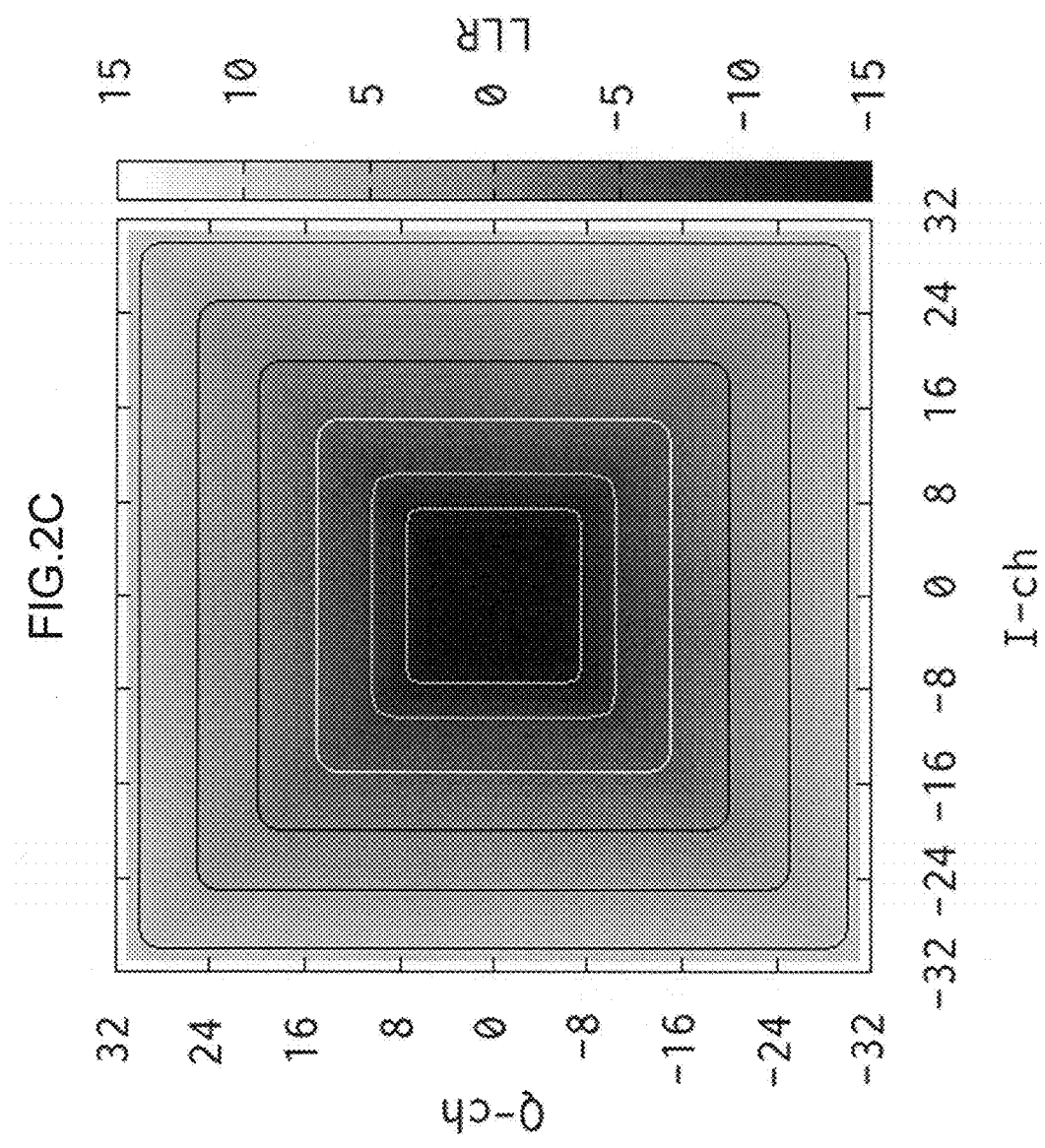

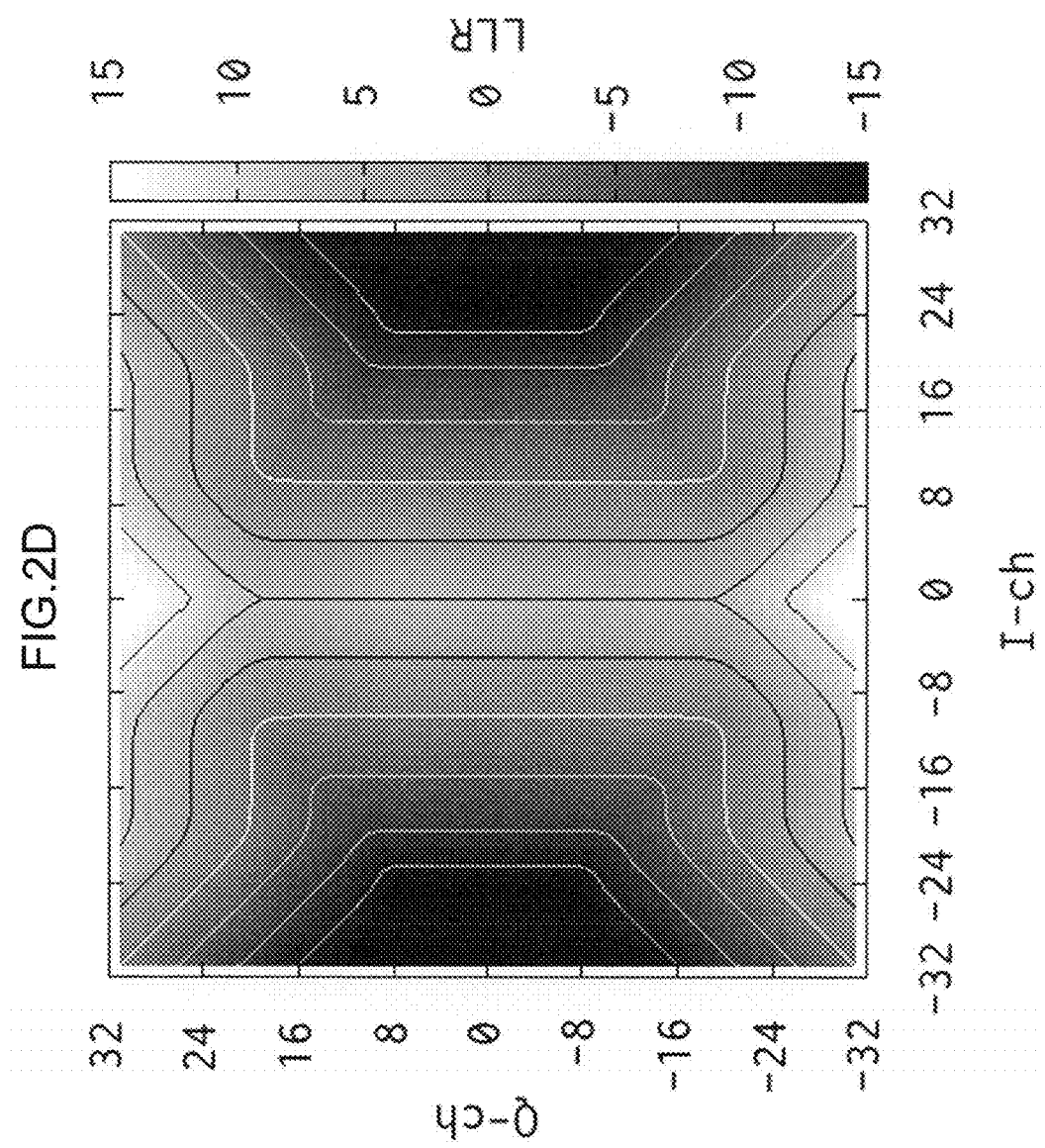

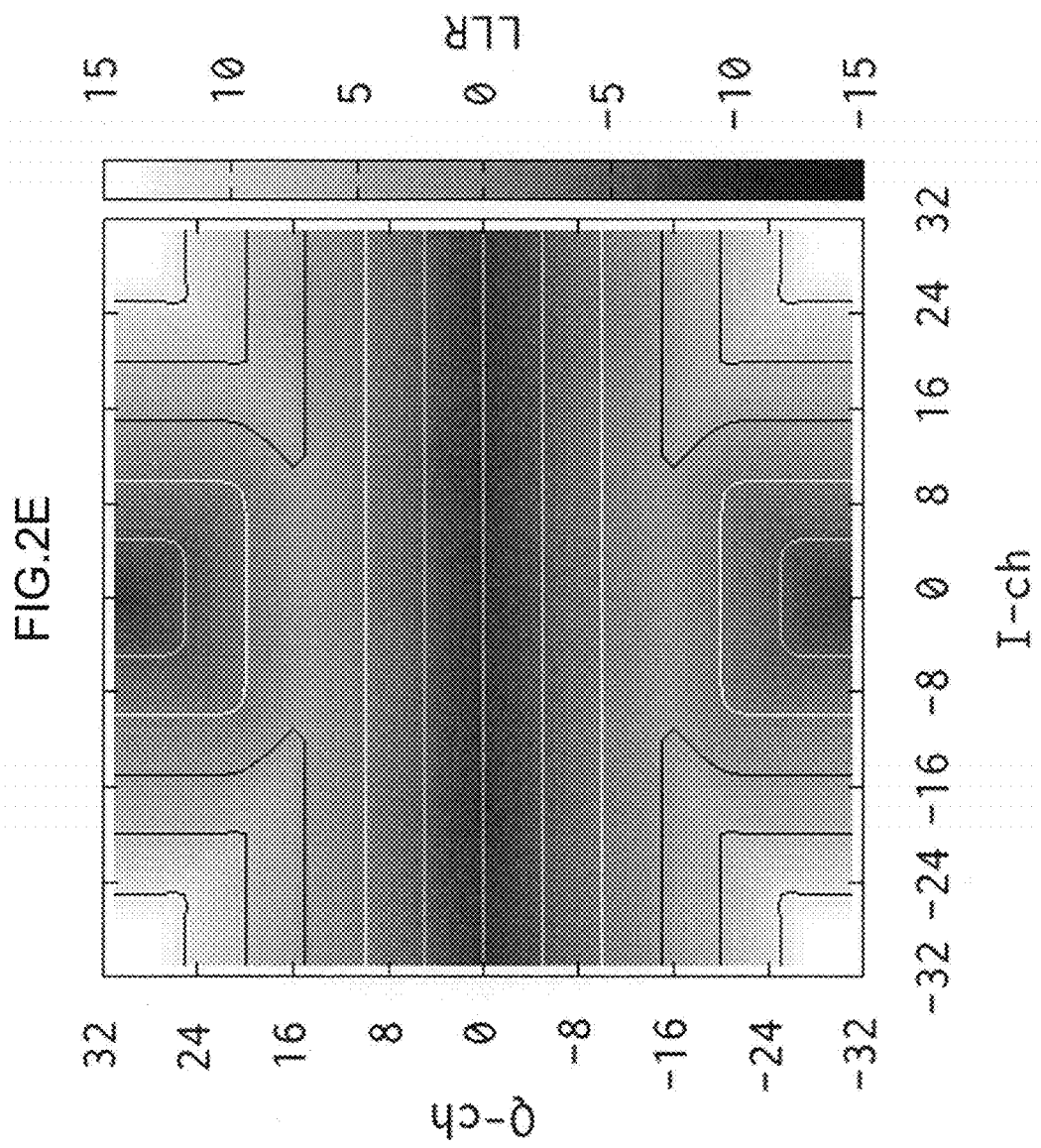

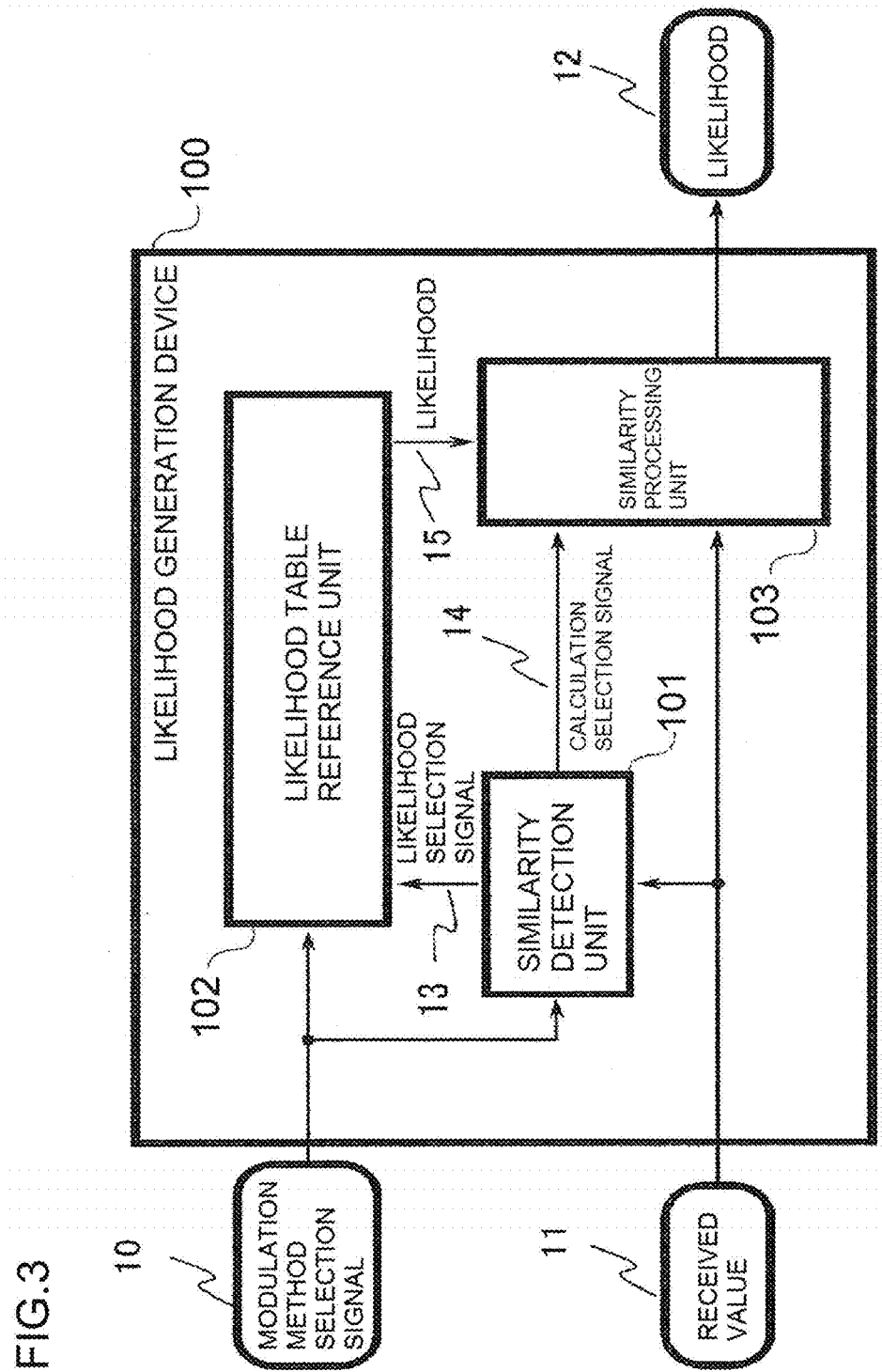

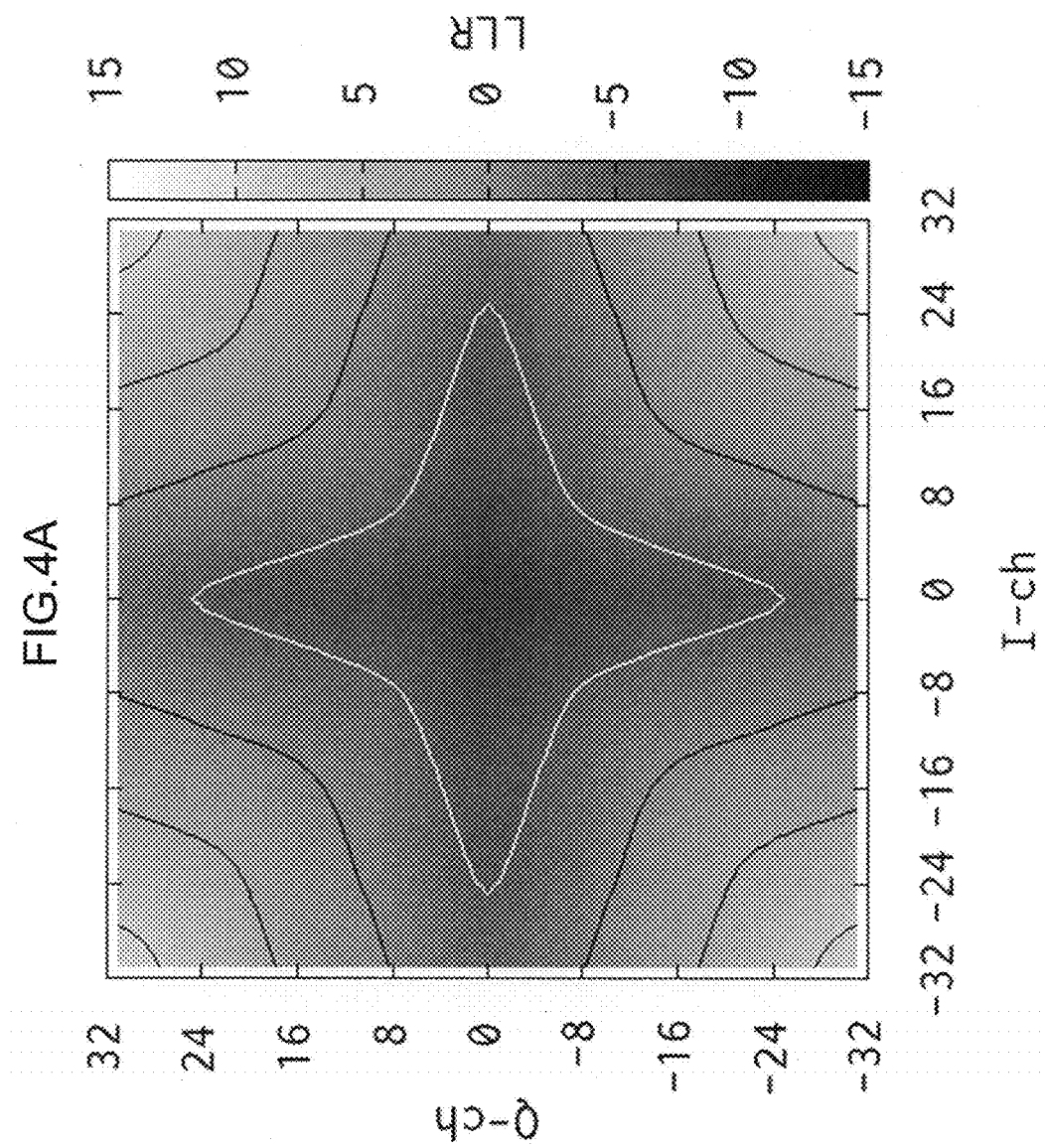

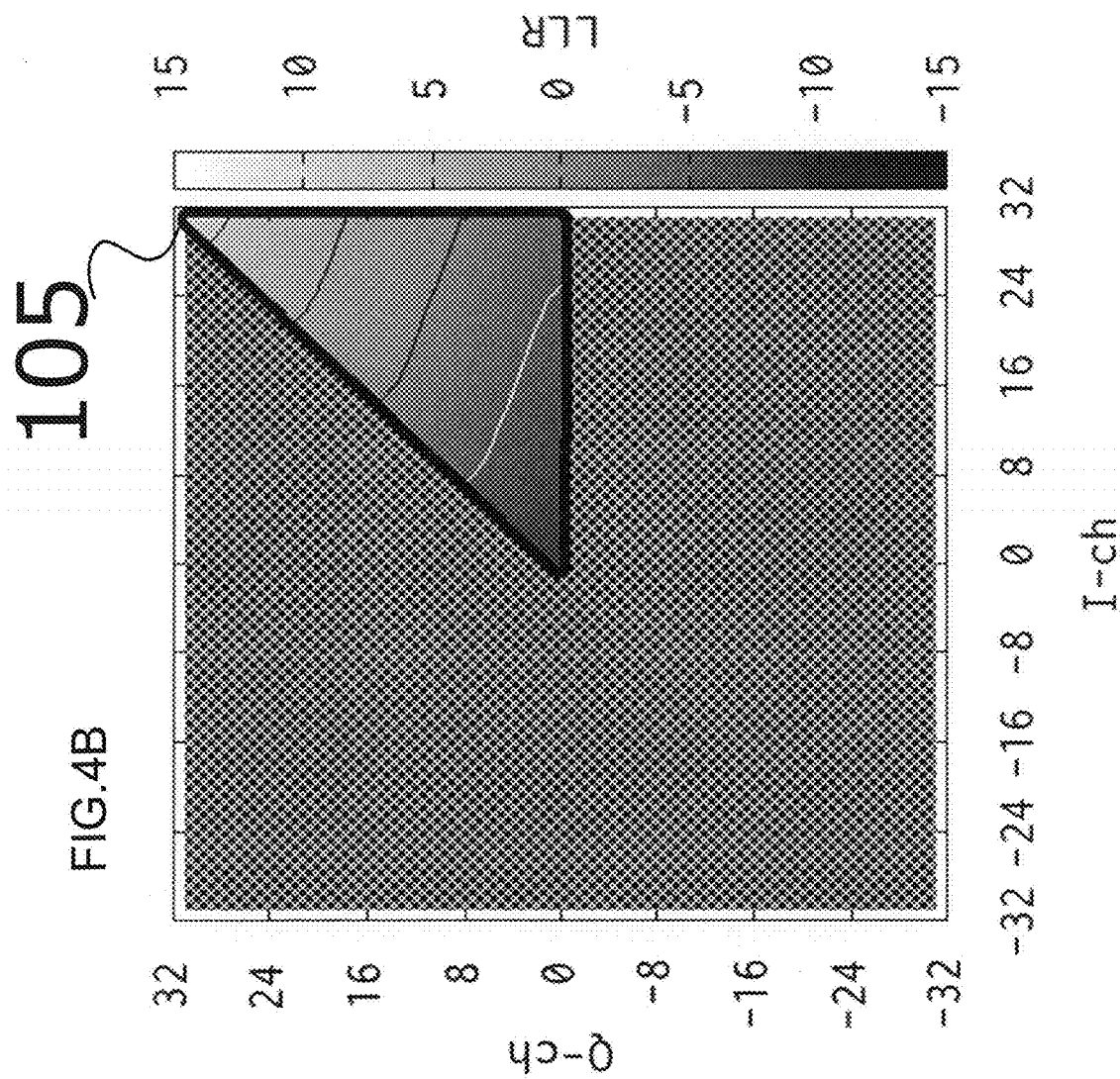

FIG.5

TABLE 1: EXAMPLE OF INPUT/OUTPUT OF SIMILARITY DETECTION UNIT

| I COMPONENT | Q COMPONENT | LIKELIHOOD SELECTION SIGNAL #0 | CALCULATION SELECTION SIGNAL #0 | LIKELIHOOD SELECTION SIGNAL #1 | CALCULATION SELECTION SIGNAL #1 | LIKELIHOOD SELECTION SIGNAL #2 | CALCULATION SELECTION SIGNAL #2 |
|---|---|---|---|---|---|---|---|
| [0:7] | [0:7] | 0 | A | 2 | A | 3 | D |
| [0:7] | [8:15] | 0 | B | 2 | A | 2 | A |
| [0:7] | [16:23] | 1 | C | 3 | D | 4 | B |
| ... | ... | | | | | | |

LIKELIHOOD GENERATION DEVICE

TECHNICAL FIELD

The present invention relates to a likelihood generation device.

BACKGROUND ART

In recent years, there has been adopted a multi-level modulation/demodulation technology such as quadrature phase-shift keying (QPSK), 8-quadrature amplitude modulation (QAM), or 16QAM in order to support a large-capacity optical communication system and improve the efficiency of using a frequency.

The multi-level modulation/demodulation technology such as QPSK, 8QAM, or 16QAM has a shorter interval between signal points than that of differential phase-shift keying (DPSK), which has hitherto been adopted, and thus a higher signal-noise ratio (SNR) is required in order to achieve an equivalent transmission distance and an equivalent signal speed.

In order to complement this insufficiency of the SNR, in general, an error correction decoding method, which combines strong error correction coding, for example, low density parity check (LDPC) coding with soft-decision decoding, is used. In soft-decision decoding, the position of a received signal point is used to calculate a likelihood indicating the accuracy of a bit assigned to the signal point, and this likelihood is used to execute error correction.

The algorithm of calculating a likelihood differs depending on the modulation method. For example, in a wireless system, modulation methods such as QPSK, 8QAM, 16QAM, 64QAM, frequency shift-keying (FSK), and binary phase-shift keying (BPSK) are often used, but the likelihood calculation algorithm differs for each modulation method.

Meanwhile, as the related art, there is proposed utilizing a likelihood generation circuit for another modulation method by rotating the phase of a received signal, or limiting a range in which a likelihood is generated, to thereby simplify the circuit.

For example, in Patent Literature 1, the phase of a received symbol of 8QAM is rotated to utilize a likelihood generation circuit for a received symbol modulated to QPSK. The technology described in Patent Literature 1, which uses the symmetry of a likelihood distribution to reduce the circuit scale, supports the modulation method of 8QAM.

Further, in general, when the likelihood of a signal point is to be calculated, constellation information obtained by mapping a signal point of a digital modulation signal to a two-dimensional plane, which is formed of four quadrants of from first to fourth quadrants, is used to calculate the likelihood of the signal point.

In Patent Literature 2, there is proposed a technology of generating a likelihood only in a first quadrant by rotating the phase of a received signal in order to reduce the circuit scale. The technology described in Patent Literature 2 supports only the modulation method of QAM.

CITATION LIST

Patent Literature

[PTL 1] WO 2015/056342 A1
[PTL 2] JP 2004-194079 A

SUMMARY OF INVENTION

Technical Problem

As described above, the related arts described in Patent Literatures 1 and 2 have a problem in that both the technologies support a limited modulation method. The reason that the modulation method is required to be limited is that the characteristic of a likelihood distribution differs depending on the modulation method.

Now, a description is given of likelihood distributions of QPSK and 32QAM with reference to FIG. 1A to FIG. 2E. FIG. 1A and FIG. 1B are illustrations of likelihood distributions #1 and #2 of QPSK, respectively, and FIG. 2A to FIG. 2E are illustrations of likelihood distributions #1, #2, #3, #4, and #5 of 32QAM, respectively. As illustrated in those figures, the likelihood distribution is given in such a manner that regarding a received symbol formed of an I component and a Q component, the I component is set as the horizontal axis and the Q component is set as the vertical axis, and the likelihood is indicated by thickness of a color. In this case, a log-likelihood ratio (LLR) is used to indicate the likelihood. Specifically, in the likelihood distribution, a region with a color closer to white indicates a likelihood closer to positive infinity, whereas a region with a color closer to black indicates a likelihood closer to negative infinity. Lines in the distribution are isolines connecting positions having the same likelihood.

One significant difference in likelihood distribution due to the modulation method is that a received signal modulated to QPSK results in generation of two likelihoods per symbol as illustrated in FIG. 1A and FIG. 1B, whereas a received signal modulated to 32QAM results in generation of five likelihoods per symbol as illustrated in FIG. 2A to FIG. 2E. In addition, each likelihood distribution exhibits a different characteristic. For example, as illustrated in FIG. 1A and FIG. 1B, the likelihood distribution of QPSK changes only in a certain dimension. The likelihood distribution #1 changes only in the horizontal direction, and the likelihood distribution #2 changes only in the vertical direction. Further, the interval between isolines is substantially constant in both of the likelihood distribution #1 and the likelihood distribution #2. Meanwhile, as can be understood from FIG. 2A to FIG. 2E, the likelihood distribution of 32QAM has a tendency in each of the distributions #1 to #5, but is clearly different from the likelihood distribution of QPSK. In this manner, each modulation method has a tendency in likelihood distribution, but the tendency differs for each modulation method, with the result that the likelihood calculation processing cannot be handled by one circuit.

The present invention has been made to solve the above-mentioned problem, and has an object to provide a likelihood generation device capable of generating a likelihood with the minimum table capacity to reduce the circuit scale without limiting the modulation method.

Solution to Problem

According to one embodiment of the present invention, there is provided a likelihood generation device, which is configured to generate a likelihood of each information bit included in a received value modulated by any modulation method, the likelihood generation device including: a similarity detection unit configured to: receive input of a modulation method selection signal for specifying a modulation method and the received value to detect a likelihood similarity between information bits included in the received value based on the modulation method selection signal; and output, as a detection result, a likelihood selection signal for specifying likelihood data to be searched for in a likelihood table, and a calculation selection signal for specifying a type of calculation to be applied to the likelihood data; a likelihood table reference unit configured to: divide an entire likelihood distribution indicating a likelihood of the information bit into a plurality of small regions; store the likelihood table in which only a small region having a likelihood that is different from a likelihood of another small region is registered as likelihood data; and extract the likelihood data specified by the likelihood selection signal from the likelihood table; and a similarity processing unit configured to perform the type of calculation specified by the calculation selection signal for the likelihood data extracted by the likelihood table reference unit, to thereby acquire the entire likelihood distribution to output the entire likelihood distribution.

Advantageous Effects of Invention

According to the likelihood generation device of the present invention, it is possible to generate a likelihood with the minimum table capacity without limiting the modulation method by executing the preprocessing of detecting the characteristic of the likelihood distribution for each modulation method before calculation of the likelihood, and hence it is possible to reduce the circuit scale.

BRIEF DESCRIPTION OF DRAWINGS

FIG. 1A is a diagram for illustrating an example of a likelihood distribution #1 of QPSK.

FIG. 1B is a diagram for illustrating an example of a likelihood distribution #2 of QPSK.

FIG. 2A is a diagram for illustrating an example of a likelihood distribution #1 of 32QAM.

FIG. 2C is a diagram for illustrating an example of a likelihood distribution #3 of 32QAM.

FIG. 2D is a diagram for illustrating an example of a likelihood distribution #4 of 32QAM.

FIG. 2E is a diagram for illustrating an example of a likelihood distribution #5 of 32QAM.

FIG. 3 is a block diagram for illustrating a configuration of a likelihood generation device according to a first embodiment of the present invention.

FIG. 4A is a diagram for illustrating an example of an entire original likelihood distribution including small regions stored in a likelihood table of the likelihood generation device according to the first embodiment of the present invention.

FIG. 4B is a diagram for illustrating a small region included in the original likelihood distribution of FIG. 4A, which is stored in the likelihood table of the likelihood generation device according to the first embodiment of the present invention.

FIG. 5 is a table for showing an example of input/output of a similarity detection unit of the likelihood generation device according to the first embodiment of the present invention.

DESCRIPTION OF EMBODIMENTS

Figure 2B:
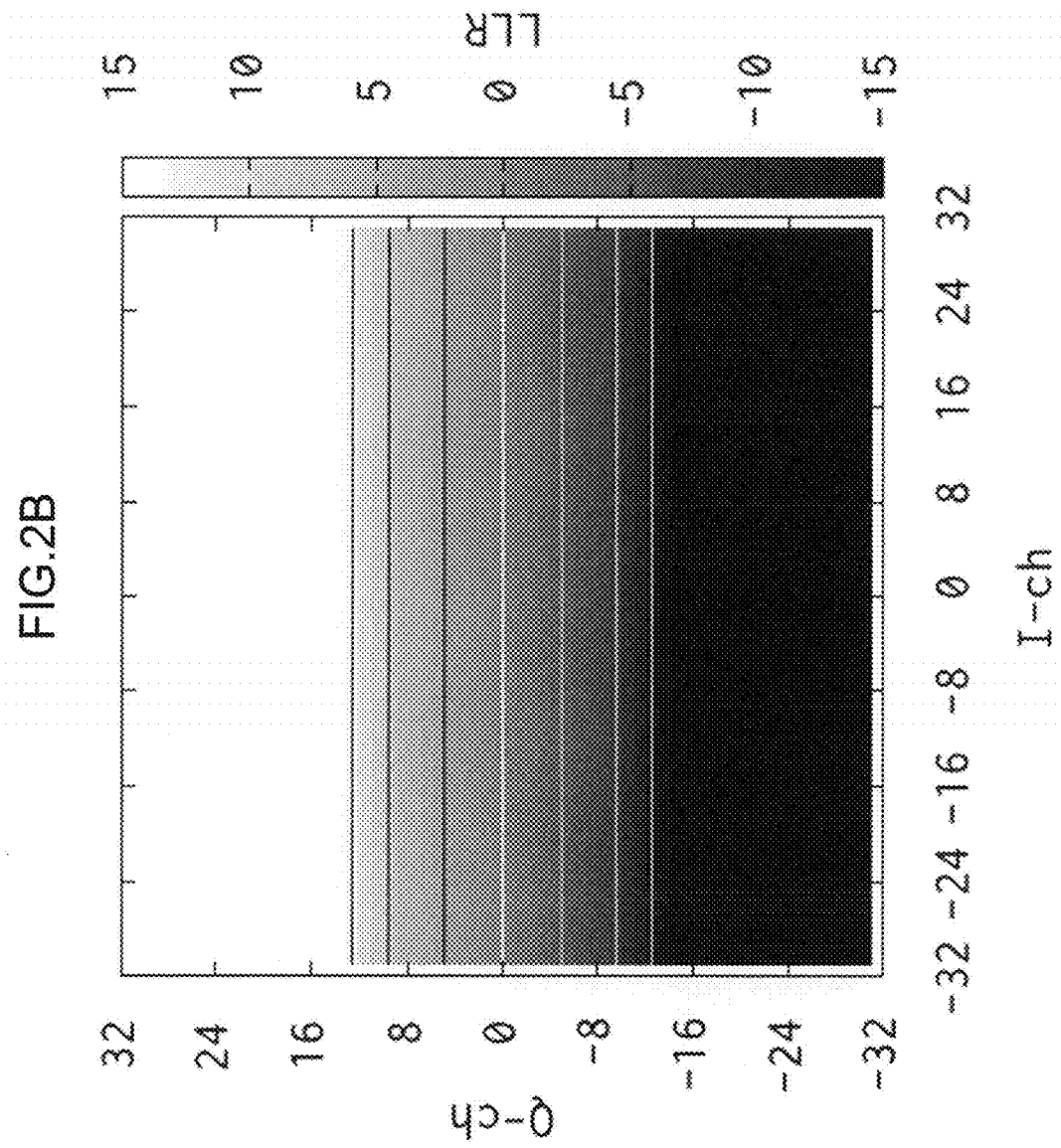
FIG. 2B is a diagram for illustrating an example of a likelihood distribution #2 of 32QAM.

A description is now given of a likelihood generation device according to embodiments of the present invention with reference to the accompanying drawings.

First Embodiment

FIG. 3 is a block diagram for illustrating a configuration of a likelihood generation device according to a first embodiment of the present invention. In FIG. 3, a likelihood generation device 100 is a device configured to receive a modulation method selection signal 10 and a received value 11 from the outside, and calculate a likelihood 12. As illustrated in FIG. 3, the likelihood generation device 100 includes a similarity detection unit 101, a likelihood table reference unit 102, and a similarity processing unit 103.

The received value 11 herein refers to a received symbol set including received symbols each obtained by mapping each signal point of a received signal to a two-dimensional plane (constellation map) formed of an I axis and a Q axis, and assigning a bit string value to each signal point. Those received symbols are hereinafter referred to as "information bit".

Further, the modulation method selection signal 10 is information indicating the type of a modulation method used at the time of modulating an original baseband signal corresponding to a received signal on the transmission side. The modulation method selection signal 10 is input by a user, for example.

The similarity detection unit 101 calculates a spatial similarity of the likelihood distribution based on the modulation method selection signal 10 and the received value 11. The similarity detection unit 101 outputs a likelihood selection signal 13 to the likelihood table reference unit 102 as a result of detection of the similarity, and outputs a calculation selection signal 14 to the similarity processing unit 103. The similarity detection unit 101 may hold, as a table, information on what kind of similarity an information bit has in each coordinate of a received value, or may detect the similarity through calculation each time. In the first embodiment, a description is given of an exemplary case in which the similarity detection unit 101 holds a table.

Further, the similarity calculated by the similarity detection unit 101 is the similarity of a likelihood between information bits. The following properties are examples of the similarity.

(i) The value of a likelihood of one information bit matches the value of a likelihood of another information bit.

(ii) The value of a likelihood of one information bit differs from the value of a likelihood of another information bit only in sign. That is, the absolute values of those likelihoods match each other.

(iii) One region of a likelihood distribution matches another region of the likelihood distribution.

(iv) One region of a likelihood distribution and another region of the likelihood distribution have rotational symmetry (refer to FIG. 2C).

(v) One region of a likelihood distribution and another region of the likelihood distribution have mirror symmetry (refer to FIG. 1A, FIG. 1B, FIG. 2A, FIG. 2B, FIG. 2D, and FIG. 2E).

The likelihood selection signal 13 to be generated by the similarity detection unit 101 is a signal for uniquely selecting a likelihood stored in a likelihood table of the likelihood table reference unit 102. The likelihood selection signal 13 may specify a certain point or a plurality of points in the likelihood distribution, or may specify a certain range of the likelihood distribution.

Further, the calculation selection signal 14 to be generated by the similarity detection unit 101 is information for specifying a type of calculation to be applied to the likelihood selected by the likelihood selection signal 13. Examples of the calculation include selection of a likelihood value from likelihood distribution data, inversion of the sign of a likelihood value, rotation of coordinates of a likelihood value, calculation of a mirror image of a likelihood value, or translation of a likelihood value.

The likelihood table reference unit 102 stores the likelihood table in advance. The likelihood table stores likelihood distribution data for each modulation method. The likelihood table reference unit 102 refers to the likelihood table based on the modulation method selection signal 10 received from the outside and the likelihood selection signal 13 received from the similarity detection unit 101 to extract corresponding likelihood data, and outputs the likelihood data to the similarity processing unit 103 as a likelihood 15.

Now, a description is given of the likelihood distribution data to be stored into the likelihood table of the likelihood table reference unit 102. FIG. 4A is an illustration of an entire likelihood distribution of a certain modulation method. Further, FIG. 4B is an illustration of a small region 105 included in the likelihood distribution stored in the likelihood table. As can be understood from FIG. 4A, the likelihood distribution of FIG. 4A has such a tendency that the likelihoods of adjacent quadrants have line symmetry. Further, when a line to divide one quadrant into two equal parts with respect to a central angle is drawn in the quadrant, the likelihood is line-symmetric with respect to the line. Thus, the entire likelihood distribution of FIG. 4A is divided into eight equal parts so that the size of each part is equal to that of the small region 105 illustrated in FIG. 4B. Specifically, the likelihood distribution of FIG. 4A is divided into four quadrants, and further, each quadrant is divided into two equal parts to generate the small region 105 of FIG. 4B.

At this time, as can be understood from comparison between FIG. 4A and FIG. 4B, it is possible to acquire the entire likelihood distribution of FIG. 4A through calculation of rotation or acquisition of a mirror image of the likelihood of the small region 105. Meanwhile, when attention is given to only the small region 105, in whichever region rotation or acquisition of a mirror image of the likelihood is calculated, the likelihood does not match that of another region. Thus, the small region 105 cannot be divided into smaller regions. In this manner, the small region 105 is generated by securing only a part of the region for which the likelihood does not match that of another region and excluding the other parts. Then, only the likelihood data of the small region 105 is stored in the likelihood table. In this manner, when only the likelihood data of the small region 105 is stored, the likelihood of another region can be acquired through calculation based on the likelihood of the small region 105. Thus, in the first embodiment, only the likelihood of the small region 105 is stored in the likelihood table of the likelihood table reference unit 102 as the likelihood distribution data. In this manner, when a small region for which the likelihood does not overlap with that of another small region is generated within the likelihood distribution to minimize overlapping pieces of likelihood data, and only the likelihood data of the small region is stored in the likelihood table, it is possible to greatly reduce the circuit scale of the likelihood table compared to a case in which the likelihood data of the entire likelihood distribution is stored.

The description has been given of a case in which the entire likelihood distribution is divided into eight equal parts. However, alternatively, a region larger than the small region 105 may be stored in the likelihood table of the likelihood table reference unit 102. For example, the likelihood distribution of FIG. 4A may be divided into four equal parts or two equal parts to generate small regions, and the likelihoods of those small regions may be stored in the likelihood table. In that case, the amount of calculation at the time of acquiring the likelihood value of the entire likelihood distribution based on the likelihood value of a small region becomes smaller, and thus the calculation processing can be simplified to achieve simplification of the entire device.

Further, the tendency of the likelihood distribution differs for each modulation method as described with reference to FIG. 1A to FIG. 2E, and thus when a small region is generated, the small region 105 not overlapping with other small regions is acquired to minimize overlapping pieces of likelihood data in consideration of the tendency, and is stored in the likelihood table. As a result, the shape of the small region 105 differs for each modulation method.

The likelihood table reference unit 102 searches for corresponding likelihood data specified by the likelihood selection signal 13 from the likelihood table stored for each modulation method based on the modulation method selection signal 10 and the likelihood selection signal 13, and outputs the likelihood data to the similarity processing unit 103 as the likelihood 15. The likelihood 15 is one likelihood value when a certain point of the likelihood distribution is specified by the likelihood selection signal 13, but is a set of likelihood values when a plurality of points or a certain region of the likelihood distribution is specified by the likelihood selection signal 13.

The similarity processing unit 103 subjects the likelihood 15 output from the likelihood table reference unit 102 to calculation specified by the calculation selection signal 14 based on the received value 11 received from the outside and the calculation selection signal 14 from the similarity detection unit 101, to thereby calculate the likelihood value of the entire likelihood distribution from the likelihood 15 and output the likelihood value as the definitive likelihood 12. That is, for example, when the likelihood distribution data of the small region 105 of FIG. 4B is input as the likelihood 15, the similarity processing unit 103 performs calculation of coordinate rotation or acquisition of a mirror image of the likelihood 15 to acquire the entire likelihood distribution illustrated in FIG. 4A and output the likelihood distribution as the definitive likelihood 12. Further, when the likelihood 15 is a set of likelihood values, the likelihood of a certain point is selected from the likelihood distribution illustrated in FIG. 4A by using the received value 11, and is output as the likelihood 12. Output from the similarity processing unit 103 serves as output from the likelihood generation device 100.

Now, a more detailed description is given of an operation of the similarity detection unit 101 with reference to FIG. 5. As described above, in the first embodiment, a description is given of a case in which the similarity detection unit 101 holds, as an input/output table, information on what kind of similarity an information bit has in each coordinate of a received value. A table 1 shown in FIG. 5 is an example of the input/output table of the similarity detection unit 101. In the similarity detection unit 101, a likelihood selection signal and a calculation selection signal are defined in advance for the entire section of a received value. Thus, the similarity detection unit 101 stores such an input/output table as shown in the table 1 in advance. As shown in FIG. 5, the input/output table stores a likelihood selection signal and a calculation selection signal for each section of a received value. Thus, when the similarity detection unit 101 receives input of each section of the I component and Q component of each information bit included in the received value 11, the similarity detection unit 101 refers to the input/output table to output the likelihood selection signal 13 and the calculation selection signal 14 corresponding to the respective sections. As described above, the likelihood selection signal 13 is a signal for uniquely selecting a likelihood stored in the likelihood table of the likelihood table reference unit 102. A likelihood stored in the likelihood table is uniquely specified in accordance with values of "0", "1", "2", . . . in the likelihood selection signal 13. The calculation selection signal 14 is a signal indicating the type of calculation to be performed by the similarity processing unit 103. For example, when the calculation selection signal 14 indicates "A", calculation of "rotation by 90 degrees" is performed, or when the calculation selection signal 14 indicates "B", calculation of "inversion in horizontal direction" is performed. In this manner, the calculation selection signal 14 specifies calculation to be performed by the similarity processing unit 103. As described above, in the similarity detection unit 101, the likelihood selection signal 13 and the calculation selection signal 14 are defined in advance for the section of the received value 11 depending on each modulation method, and thus calculation processing is extremely simple. Thus, the similarity detection unit 101 can be implemented by such a small circuit scale as to be ignorable compared with the likelihood table.

Next, a description is given of an operation of the likelihood generation device according to the first embodiment of the present invention.

First, the similarity detection unit 101 refers to the input/output table of FIG. 5 for the section of the input received value 11 based on the modulation method selection signal 10 to calculate a similarity between likelihoods. The calculation result is output as the likelihood selection signal 13 and the calculation selection signal 14. The likelihood table reference unit 102 receives input of the likelihood selection signal 13, and the similarity processing unit 103 receives input of the calculation selection signal 14.

The likelihood table reference unit 102 receives input of the modulation method selection signal 10 and the likelihood selection signal 13. The likelihood table reference unit 102 refers to the likelihood table based on the modulation method specified by the modulation method selection signal 10 to acquire a likelihood or a set of likelihoods corresponding to the range selected by the likelihood selection signal 13, and outputs the likelihood or the set of likelihoods to the similarity processing unit 103 as the likelihood 15.

The similarity processing unit 103 subjects the likelihood 15 received from the likelihood table of the likelihood table reference unit 102 to calculation based on the received value 11 and the calculation selection signal 14, and outputs the likelihood as the definitive likelihood 12.

As described above, according to the first embodiment, it is possible to minimize overlapping pieces of data among likelihoods or within the likelihood distribution to be held in the likelihood table by using a similarity between information bits in the likelihood distribution. As a result, it is possible to reduce the circuit scale of the likelihood table. Further, it is possible to handle any modulation method by changing the modulation method selection signal 10 to be given to the similarity detection unit 101, to thereby be able to employ the likelihood generation device and likelihood generation method according to the first embodiment without depending on the modulation method.

Second Embodiment

In the first embodiment described above, the similarity processing unit 103 subjects the likelihood generated by the likelihood table reference unit 102 to calculation. However, in a second embodiment of the present invention, the similarity processing unit subjects the likelihood selection signal generated by the similarity detection unit to calculation.

Figure 6:
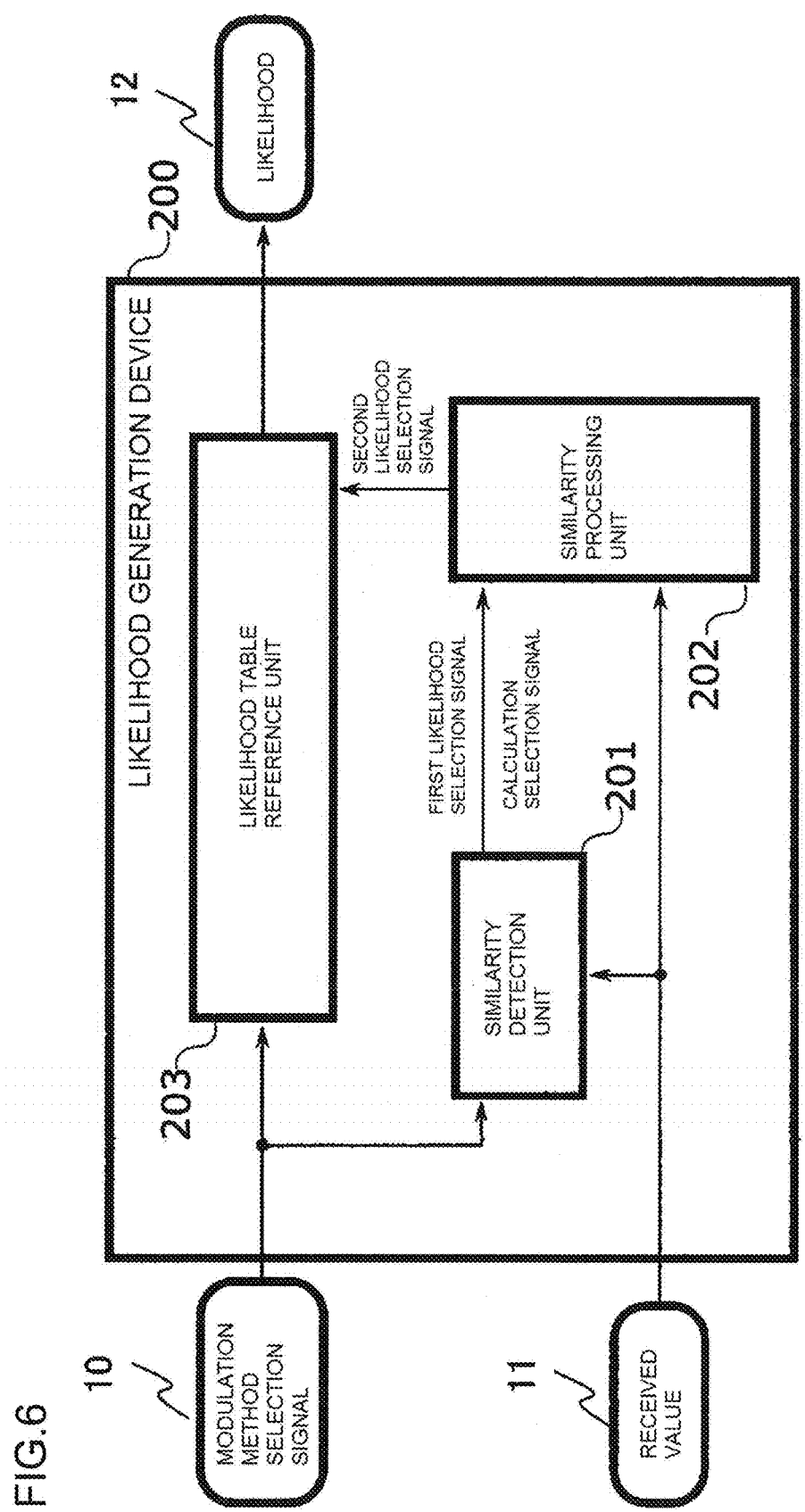
FIG. 6 is a block diagram for illustrating a configuration of a likelihood generation device according to a second embodiment of the present invention.

FIG. 6 is a block diagram for illustrating a configuration of a likelihood generation device 200 according to the second embodiment of the present invention. The likelihood generation device 200 includes a similarity detection unit 201, a similarity processing unit 202, and a likelihood table reference unit 203. Similarly to the likelihood generation device 100 according to the first embodiment, the likelihood generation device 200 is a device configured to receive the modulation method selection signal 10 and the received value 11 from the outside, and calculate the likelihood 12.

The similarity detection unit 201 detects a similarity within the likelihood distribution based on the modulation method selection signal 10 and the received value 11, and outputs a first likelihood selection signal and a calculation selection signal to the similarity processing unit 202 as a detection result. The operation of the similarity detection unit 201 is basically the same as that of the similarity detection unit 101 in the first embodiment, and thus is briefly described. The first likelihood selection signal to be output from the similarity detection unit 201 is the same as the likelihood selection signal 13 in the first embodiment. Meanwhile, the calculation selection signal is information for specifying the type of calculation to be applied to the first likelihood selection signal. The calculation selection signal in the first embodiment described above specifies the type of calculation to be applied to likelihood data, and thus differs from the calculation selection signal in the second embodiment. Also in the second embodiment, similarly to the first embodiment, when the similarity detection unit 201 uses the input/output table to acquire the first likelihood selection signal and the calculation selection signal based on the section of the received value, it is possible to reduce the circuit scale of the similarity detection unit 201.

The similarity processing unit 202 generates a second likelihood selection signal and outputs the second likelihood selection signal to the likelihood table reference unit 203 by performing processing of coordinate rotation or acquisition of a mirror image, which is specified by the calculation selection signal for the received value 11 based on the calculation selection signal received from the similarity detection unit 201 or by performing calculation of coordinate rotation or acquisition of a mirror image specified by the received value 11 and the calculation selection signal for the first likelihood selection signal. At this time, the calculation selection signal specifies which one of the result of calculation for the received value 11 and the result of calculation for the first likelihood selection signal is to be used.

The likelihood table reference unit 203 refers to the likelihood table based on the modulation method selection signal 10 and the second likelihood selection signal received from the similarity processing unit 202 to output the definitive likelihood 12. Also in the second embodiment, similarly to the first embodiment, a small region that does not overlap with another small region is generated to minimize overlapping pieces of likelihood data within the likelihood distribution, and only the likelihood data of the small region is stored in the likelihood table.

Next, a description is given of an operation of the likelihood generation device according to the second embodiment.

First, the similarity detection unit 201 acquires a similarity between information bits included in the received value 11 in the likelihood distribution based on the modulation method selection signal 10. The acquired similarity is equivalent to the similarity acquired by the similarity detection unit 101 in the first embodiment.

Next, the similarity processing unit 202 uses the received value 11, the first likelihood selection signal, and the calculation selection signal to generate a second likelihood selection signal.

Next, the likelihood table reference unit 203 uniquely selects a likelihood in the likelihood table and outputs the likelihood based on the modulation method selection signal 10 and the second likelihood selection signal. At this time, the output likelihood may be a likelihood for a plurality of information bits.

As described above, also in the second embodiment, it is possible to obtain an effect similar to that of the first embodiment described above. Further, the similarity processing unit 202 does not perform calculation processing for the likelihood itself, but performs calculation processing for a signal for selecting the likelihood. Therefore, it is possible to reduce the amount of output of data from the likelihood table reference unit 203.

Third Embodiment

The likelihood generation device according to the first embodiment and the second embodiment is formed of a dedicated circuit. However, in a third embodiment of the present invention, a description is given of an embodiment in which the likelihood generation device is formed of a processor and a memory. In a likelihood generation device 300, the function corresponding to each function of the likelihood generation device 100 illustrated in the first embodiment is implemented by program processing. However, the third embodiment is not limited to this case, and it is to be understood that each function of the likelihood generation device 200 illustrated in the second embodiment can also be implemented by the likelihood generation device 300. Thus, a description is omitted for a case in which the likelihood generation device 300 implements each function of the second embodiment.

Figure 7:
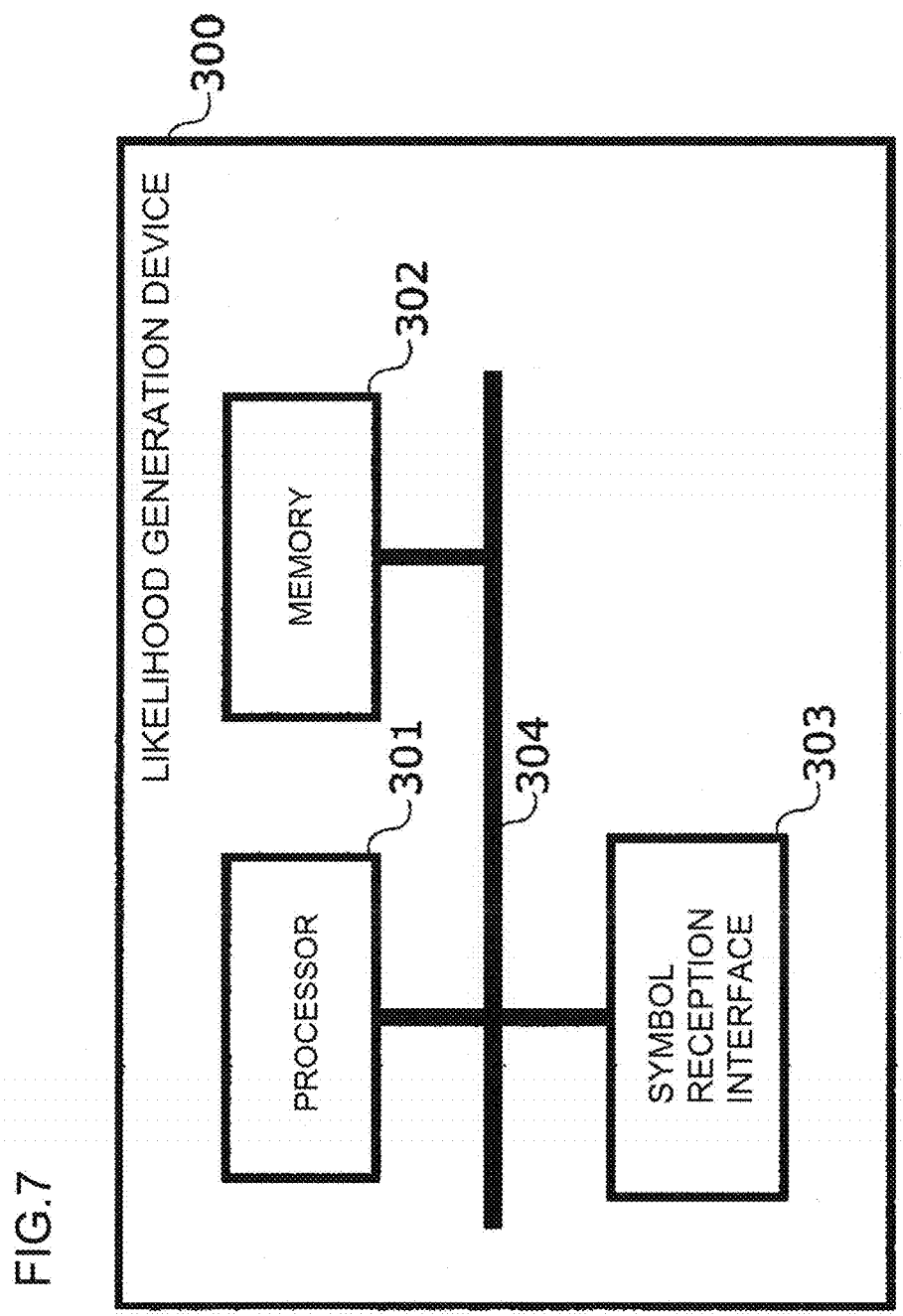
FIG. 7 is a block diagram for illustrating a hardware configuration of a likelihood generation device according to a third embodiment of the present invention.

FIG. 7 is a hardware configuration diagram of the likelihood generation device according to the third embodiment. The likelihood generation device 300 includes a processor 301, a memory 302, and a symbol reception interface 303. The processor 301 of the likelihood generation device 300 executes a program stored in the memory 302 to implement each function of the likelihood generation device 100. Thus, similarly to the likelihood generation device 100, the likelihood generation device 300 is a device configured to calculate the likelihood 12 based on the modulation method selection signal 10 and the received value 11.

The processor 301 receives a command and processing data from the memory 302 and the symbol reception interface 303 via a communication channel 304, and executes processing for the processing data in accordance with the command. The processor 301 may process a plurality of pieces of processing data at once, or may operate in accordance with a plurality of commands at once. Further, the likelihood generation device 300 may include the plurality of processors 301. In that case, the likelihood generation device 300 may include the plurality of processors 301 having the same configuration, or may include a plurality of processors of different types.

The memory 302 is a storage device for storing a program and data. The memory 302 receives a command to read/write data and an address to be read/written from the processor 301 via the communication channel 304, and receives data to be written or passes read data, for example. At this time, the memory 302 may handle a plurality of read/write commands at the same time. Further, the likelihood generation device 300 may include the plurality of memories 302. In that case, the likelihood generation device 300 may include the plurality of memories 302 having the same configuration, or may include a plurality of memories of different types.

The symbol reception interface 303 receives the modulation method selection signal 10 and the received value 11 from the outside, and outputs the modulation method selection signal 10 and the received value 11 to the processor 301 or the memory 302 via the communication channel 304.

The communication channel 304 connects the processor 301, the memory 302, and the symbol reception interface 303 to one another for exchange of data. At this time, the communication channel 304 may have a function of being capable of connecting a plurality of devices to one another at the same time.

Figure 8:
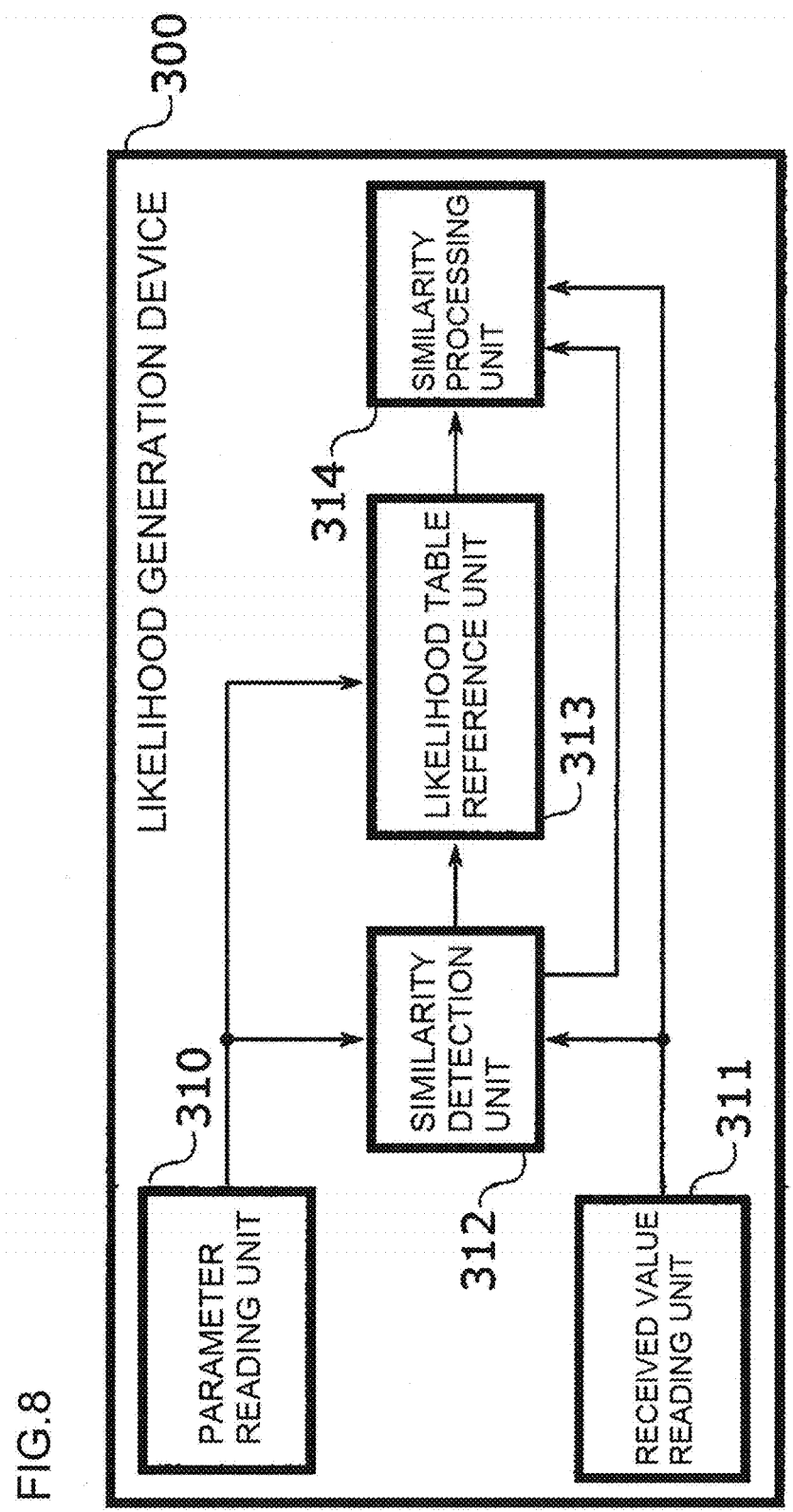
FIG. 8 is a block diagram for illustrating a configuration of the likelihood generation device according to the third embodiment of the present invention.

FIG. 8 is a functional configuration diagram of the likelihood generation device 300. As illustrated in FIG. 8, the likelihood generation device 300 includes respective functions of a parameter reading unit 310, a received value reading unit 311, a similarity detection unit 312, a likelihood table reference unit 313, and a similarity processing unit 314.

The parameter reading unit 310 and the received value reading unit 311 read modulation method selection data and received value data into the processor 301 or the memory 302 via the communication channel 304. At this time, those pieces of data may be read from the symbol reception interface 303, or may originally be held in the memory 302. The modulation method selection data and the received value data correspond to the modulation method selection signal 10 and the received value 11 described in the first embodiment, respectively.

The similarity detection unit 312 reads the modulation method selection data and the received value data from the memory 302 into the processor 301 via the communication channel 304, and calculates a similarity between information bits within the likelihood distribution by program processing. At this time, the processor 301 reads a program stored in the memory 302 and executes the program.

The likelihood table reference unit 313 refers to the likelihood table held in the memory 302 based on the likelihood selection data received from the similarity detection unit 312. At this time, the likelihood table may be rewritten based on the modulation method selection data read by the parameter reading unit 310, or the likelihood table may be switched. The likelihood or set of likelihoods read from the likelihood table is written to a storage region inside the processor 301 or the memory 302, and is passed to the similarity processing unit 314. The likelihood selection data corresponds to the likelihood selection signal 13 described in the first embodiment.

The similarity processing unit 314 executes program processing for the likelihood or set of likelihoods received from the likelihood table reference unit 313 by using calculation selection data received from the similarity detection unit 312 and received value data received from the received value reading unit 311. Calculation to be applied to the likelihood or set of likelihoods may include inversion of the sign of the likelihood, transformation of coordinates of the set of likelihoods, or selection of a likelihood from the set of likelihoods. The result of calculation may be stored in the memory 302 as a result of generation of the likelihood, or may be passed to other devices via the communication channel 304. The calculation selection data corresponds to the calculation selection signal described in the first embodiment.

As described above, also in the third embodiment, it is possible to obtain effects similar to those of the first and second embodiments. Further, in the third embodiment, the likelihood generation device is implemented by program processing, and thus it is possible to reduce the memory region for the likelihood table without requiring dedicated hardware as in the first embodiment and the second embodiment.

REFERENCE SIGNS LIST

10 modulation method selection signal, 11 received value, 12 likelihood, 13 likelihood selection signal, 14 calculation selection signal, 15 likelihood, 100, 200, 300 likelihood generation device, 101, 201 similarity detection unit, 102, 203 likelihood table reference unit, 103, 202 similarity processing unit, 301 processor, 302 memory, 303 symbol reception interface, 304 communication channel, 310 parameter reading unit, 311 received value reading unit, 312 similarity detection unit, 313 likelihood table reference unit, 314 similarity processing unit

The invention claimed is:

1. A likelihood generation device, which is configured to generate a likelihood of each of information bits included in a received value, the likelihood generation device comprising:
   a similarity detector configured to:
      receive input of a modulation method selection signal for specifying a modulation method and the received value;
      detect a likelihood similarity between the information bits included in the received value based on the modulation method selection signal; and
      output, as a detection result, a likelihood selection signal for specifying likelihood data to be searched for in a likelihood table, and a calculation selection signal for specifying a type of calculation to be applied to the likelihood data;
   a likelihood table referrer configured to:
      divide an entire likelihood distribution indicating a likelihood of the information bit into a plurality of small regions;
      store the likelihood table in which only a small region having a likelihood that is different from a likelihood of another small region is registered as the likelihood data; and
      extract the likelihood data specified by the likelihood selection signal from the likelihood table; and
   a similarity processor configured to perform the type of calculation specified by the calculation selection signal for the likelihood data extracted by the likelihood table referrer, to thereby acquire the entire likelihood distribution to output the entire likelihood distribution.

2. The likelihood generation device according to claim 1, wherein the similarity detector stores in advance an input/output table that defines in advance a relationship between a section of the received value and the likelihood selection signal, and a relationship between the section of the received value and the calculation selection signal, and
   wherein the similarity detector is configured to extract, when the section of the received value is input, the likelihood selection signal and the calculation selection signal corresponding to the section of the received value from the input/output table.

3. A likelihood generation device, which is configured to generate a likelihood of each of information bits included in a received value, the likelihood generation device comprising:
   a similarity detector configured to:
      receive input of a modulation method selection signal for specifying a modulation method and the received value;
      detect a likelihood similarity between the information bits included in the received value based on the modulation method selection signal; and
      output, as a detection result, a first likelihood selection signal for temporarily specifying likelihood data to be searched for in a likelihood table, and a calculation selection signal for specifying a type of calculation to he applied to the first likelihood selection signal;
   a similarity processor configured to perform the type of calculation specified by the calculation selection signal for the first likelihood selection signal output from the similarity detector and the received value, to thereby output a second likelihood selection signal for definitively specifying likelihood data to be searched for in the likelihood table; and
   a likelihood table referrer configured to:
      divide an entire likelihood distribution indicating a likelihood of the information bit into a plurality of small regions;
      store the likelihood table in which only a small region having a likelihood that is different from a likelihood of another small region is registered as the likelihood data; and
      extract the likelihood data specified by the second likelihood selection signal from the likelihood table.

4. The likelihood generation device according to claim 3, wherein the similarity detector stores in advance an input/output table that defines in advance a relationship between a section of the received value and the first likelihood selection signals, and a relationship between the section of the received value and the calculation selection signal, and
   wherein the similarity detector is configured to extract, when the section of the received value is input, the first likelihood selection signal and the calculation selection signal corresponding to the section of the received value from the input/output table.

5. The likelihood generation device according to claim 1, wherein the specified modulation method is one modulation method from a plurality of modulation methods.

6. The likelihood generation device according to claim 3, wherein the specified modulation method is one modulation method from a plurality of modulation methods.

* * * * *